United States Patent [19]

Hansel

[11] 3,734,149
[45] May 22, 1973

[54] REFUELING SYSTEM FOR AUTOMOBILES

[75] Inventor: William B. Hansel, Media, Pa.

[73] Assignee: Sun Oil Company, Philadelphia, Pa.

[22] Filed: Oct. 30, 1970

[21] Appl. No.: 85,563

[52] U.S. Cl. ..................141/350, 141/95, 141/285
[51] Int. Cl. ...............................................B65b 1/04
[58] Field of Search....................222/536, 556, 516, 222/517, 188, 468, 481.5, 526–530; 141/309, 382, 309, 350; 239/576, 577; 220/86 R, 86 AT; 251/4, 9; 137/355.18

[56] References Cited

UNITED STATES PATENTS

| | | | |
|---|---|---|---|
| 3,181,743 | 5/1965 | Libit et al. | 222/528 |
| 380,039 | 3/1888 | Johnson | 239/576 X |
| 3,329,389 | 7/1967 | Clark | 251/4 |
| 251,832 | 1/1882 | Clark | 222/536 X |
| 2,458,245 | 1/1949 | Bordelon | 220/86 X |
| 3,478,922 | 11/1969 | Mole | 220/86 |
| 846,619 | 3/1907 | Reiber | 222/188 |
| 640,495 | 1/1900 | Spangler | 222/188 |
| 524,754 | 8/1894 | Chable | 222/536 |
| 2,014,730 | 9/1935 | Gorman et al. | 222/517 X |
| 2,268,697 | 1/1942 | Coleman | 220/86 |
| 3,392,887 | 7/1968 | Bross | 222/530 X |
| 830,422 | 9/1906 | Epperson | 222/468 |
| 3,369,718 | 2/1968 | Libit et al. | 222/481.5 |
| 1,548,956 | 8/1925 | Rosenberg | 222/529 X |
| 470,776 | 3/1892 | Beehler | 222/529 |

FOREIGN PATENTS OR APPLICATIONS 249,743  7/1947  Switzerland..........................222/188

Primary Examiner—Samuel F. Coleman
Assistant Examiner—Norman L. Stack, Jr.
Attorney—George L. Church, Donald R. Johnson, Wilmer E. McCorquodale, Jr. and Frank A. Rechif

[57] ABSTRACT

A "tight-break" gravity refueling system for automobiles may include a normally closed valve in the fuel tank fillpipe which is opened by the insertion into the fillpipe of a rigid dispensing tube end, a portable fuel receptacle having a rigid dispensing tube end and equipped with a self-closing valve, and a combination sight glass-vent tube coupled to the fuel tank and mounted on the automobile rear deck. Another type of fuel level indicator, mounted on the fuel tank, may be alternatively used.

3 Claims, 9 Drawing Figures

PATENTED MAY 22 1973

INVENTOR:
WILLIAM B. HANSEL
BY F.A. Rechif
ATTY.

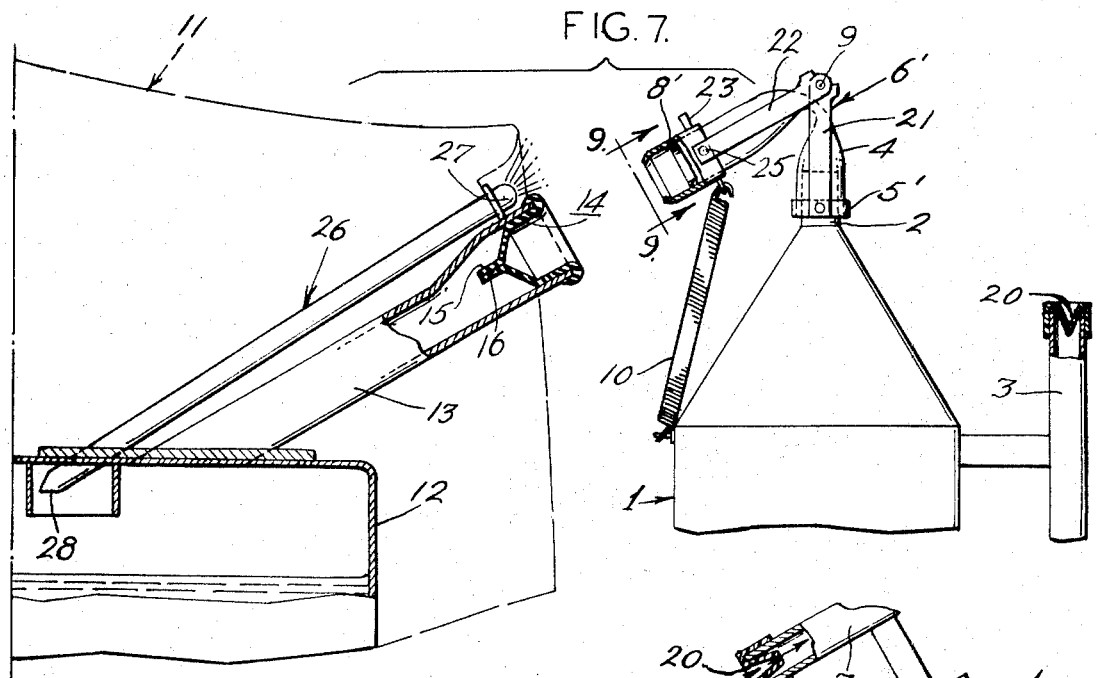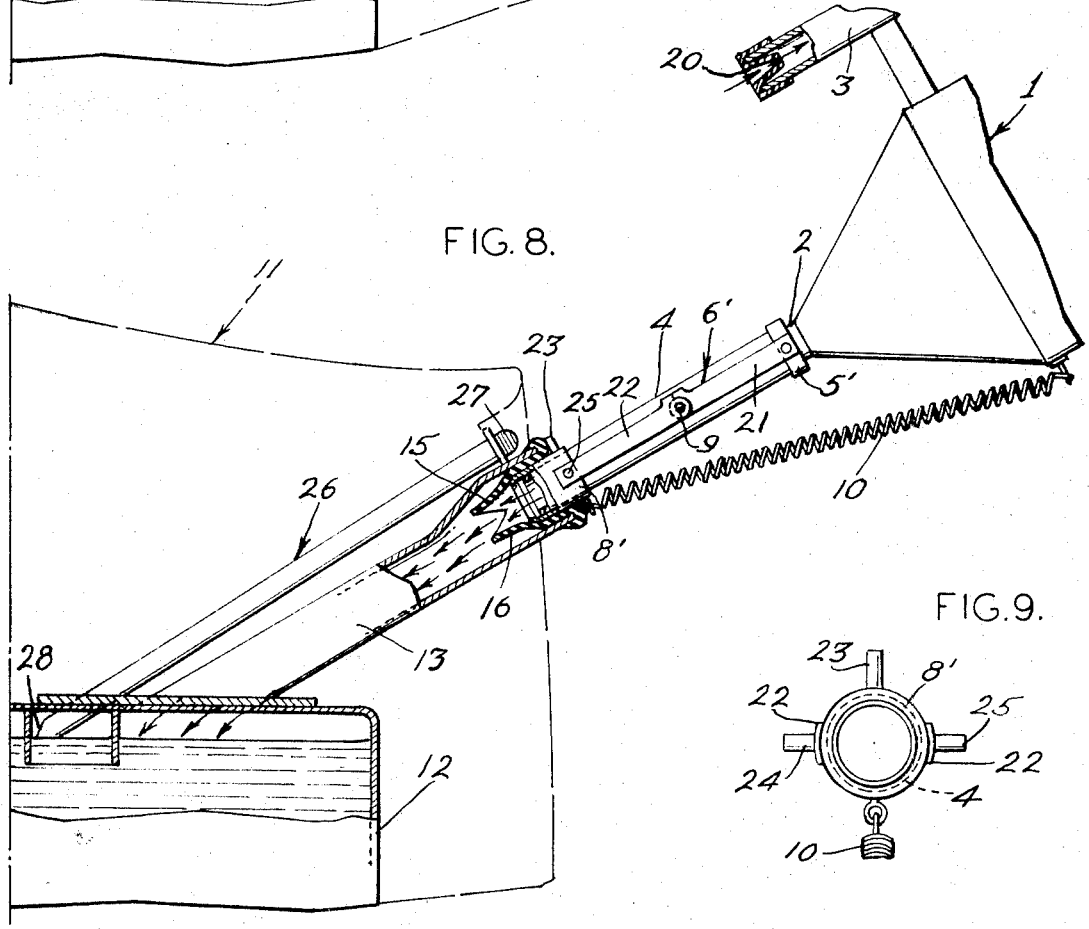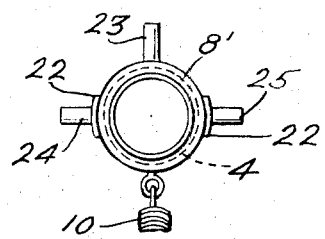

REFUELING SYSTEM FOR AUTOMOBILES

This invention relates to a refueling system for automobiles, especially for competition automobiles (racing cars).

The refueling of most of the competition automobiles, during so-called "pit stops," is governed by rules and regulations established by the Sports Car Club of America (SCCA). The present SCCA regulations require a gravity transfer of fuel from an approved 11-gallon can, which is simply an elongated portable cylindrical container or receptacle having a flexible hose attached to one end of the container, and having a vent tube extending upwardly from the bottom of the container which can serve as a handle for lifting the same. The flexible hose is always completely open, and the container when filled with fuel weighs about 75 pounds.

In use, the container or receptacle must be lifted and tilted in order to push the outer end of the hose against the upwardly-extending fillpipe of the automobile fuel tank or fuel cell, and to cause the fuel to flow downwardly, by gravity, out of the container and into the fillpipe. Such procedure involves careless handling of the fuel, particularly since the lifting and tilting of the container is necessarily done rapidly, resulting in excessive spillage of fuel; this creates a safety hazard.

An object of this invention is to provide a novel refueling system for automobiles.

Another object is to provide a refueling system for racing cars which will reduce the hazards associated with the presently-used system.

A further object is to provide a "tight-break" gravity refueling system for automobiles.

A still further object is to provide a "tight-break" refueling system for competition automobiles.

The foregoing and other objects of the invention are accomplished, briefly, in the following manner: A portable fuel receptacle has a pinch-type valve (which is normally closed) on its dispensing hose, the pinching action being provided by means of a rigid dispensing tube which is hingedly mounted with respect to the receptacle. A duck-bill type valve is mounted in the fillpipe of the automobile fuel tank, the lips of this valve normally being closed but adapted to be forced open when the rigid dispensing tube on the receptacle is inserted into the fillpipe. A sight vent tube, visible from the exterior of the automobile, may be provided for the fuel tank. Alternatively, a different type of visual indicator may be employed, for indicating when the fuel tank is full.

A detailed description of the invention follows, taken in conjunction with the accompanying drawings, wherein:

FIGS. 7 and 8 are elevational views, partly broken away to illustrate details, of a refueling system according to another embodiment of the invention, the same being shown in two different stages of operation; and FIG. 9 is an elevational view looking in the direction 9—9 of FIG. 7.

Figure 1:
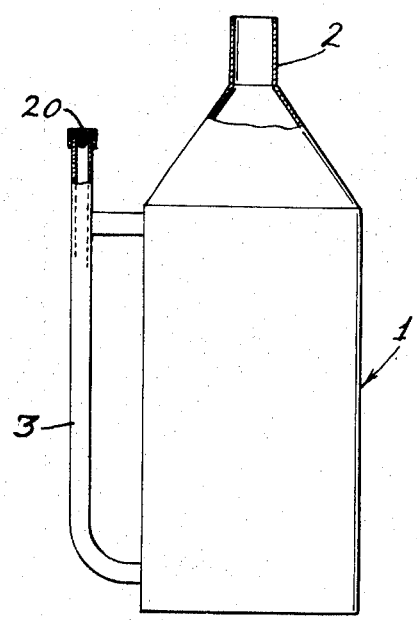
FIG. 1 is a front elevation of a basic receptacle used in the invention.

Referring now to FIG. 1, an SCCA-approved refueling can (portable receptacle) is illustrated at 1. Receptacle 1 is of elongated generally cylindrical configuration, but funneling down to a dispensing nozzle 2 (for example, 2¼ inches inside diameter) at its upper end. The receptacle 1 is adapted to contain eleven gallons of fuel (gasoline), the diameter of the main or body portion of the receptacle being 11½ inches and the overall receptacle height (including the nozzle 2) being 33 inches.

A rigid vent tube 3, of small diameter compared to the diameter of the receptacle, communicating at its lower end with the lower portion of receptacle 1 and adapted to open to the atmosphere at its upper end, extends vertically and is spaced from the receptacle; the tube 3 is secured to the receptacle, and provides a handle for lifting and manipulating the receptacle. The upper or free end of vent tube 3 is provided with a one-way vent valve 20 formed from a suitable synthetic elastomeric material and having a pair of mating lips which are normally and inherently urged into engagement with each other to provide a seal (see also FIG. 7); valve 20 prevents the flow of gasoline outwardly from receptacle 1 through tube 3 and thus prevents loss of gasoline through this tube in the event that receptacle 1 is accidentally tipped over. On the other hand, the lips of this valve will automatically open (as shown in FIG. 8) to permit the flow of air in the opposite direction (i.e., toward the receptacle 1) through tube 3 when gasoline is being poured out of receptacle 1; this automatic opening is responsive to the sucking of air through the vent tube, and provides the required venting of the can when fuel is dispensed from the same.

Figure 2:
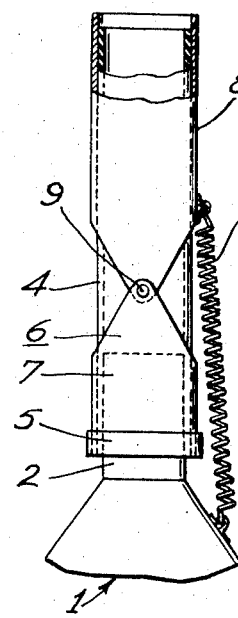
FIGS. 2 and 3 are elevational views, on an enlarged scale, of the upper portion of a receptacle according to the invention, the same being shown in two different positions.
Figure 3:
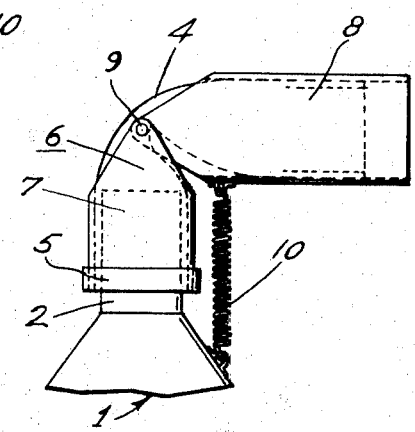

Refer now to FIGS. 2 and 3. According to this invention, one end of a piece 4 of light, flexible hose (made of a suitable synthetic material which is clear or transparent, for example) is secured by means of a suitable clamp 5 to the can nozzle 2, and also to one end of a pincher assembly denoted generally by numeral 6. The pincher assembly 6 in a first embodiment comprises a pair of rigid tubular members 7 and 8 arranged in end-to-end relationship and pivotally (hingedly) connected together as at 9, at two diametrically-opposite locations, member 7 being secured to the can 1 and member 8 being pivotable with respect thereto. The hose 4 extends from can nozzle 2 entirely through member 7 and a substantial distance into member 8, terminating just short of the outer end of member 8. When the members 7 and 8 are in the "straight" position of FIG. 2, wherein they extend substantially parallel to the longitudinal axis of receptacle 1, the hose 4 is open, providing a clear and unobstructed flow area. However, when member 8 is swung to the "bent" position of FIG. 3, wherein it extends at substantially 90° to the receptacle longitudinal axis, the hose 4 is pinched off by being bent upon itself and is collapsed, thus closing off the flow area of the hose. Then, the dispensing hose 4 is sealed.

Normally, the assembly 6 is in the "bent" or hose-bore-closed position illustrated in FIG. 3. It is biased to this position by means of a rather strong tension spring 10 one end of which is attached to receptacle 1 and the other end of which is attached to member 8. The structure just described thus provides a pinch-type self-closing valve on the refueling receptacle 1. Since this valve is self-closing and is therefore closed at all times except during the actual dispensing of fuel, it comprises a part of the "tight-break" refueling system of this invention. Fuel spills from the refueling can are prevented, even if the can 1 is accidentally tipped over (as previously described, the one-way valve 20 helps to obtain this result). Also, it may be noted that the vent valve 20 and the self-closing valve on the dispensing portion of can 1 function in combination to seal the can against losses of gasoline vapors. Thus, they combat air pollution.

Figure 4:
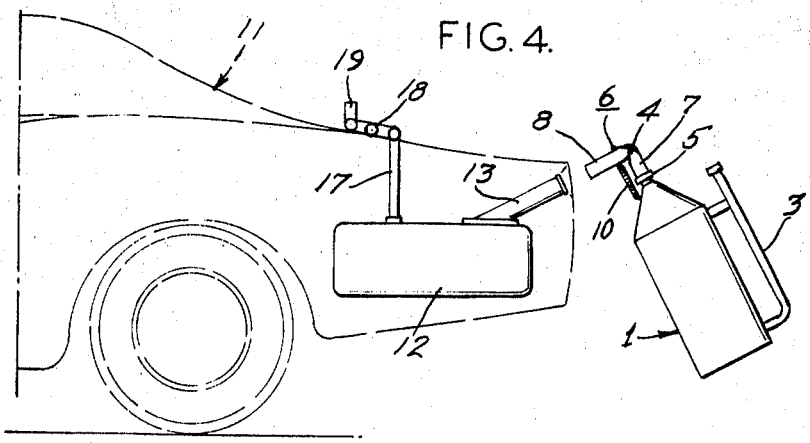
FIGS. 4 and 5 are diagrammatic views of a refueling system according to one embodiment of the invention, the same being shown in two different stages of operation.
Figure 5:
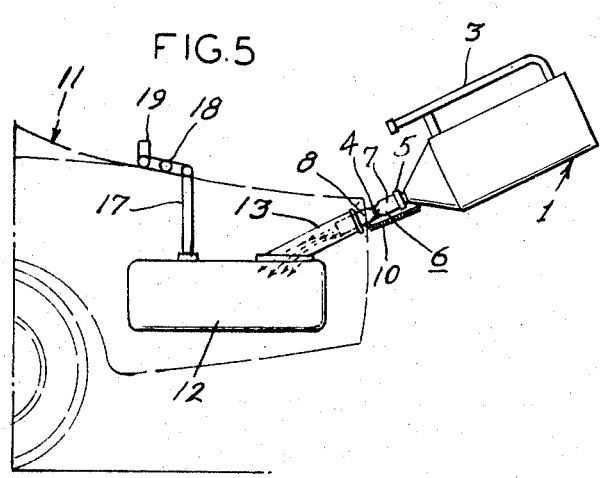
Figure 6:
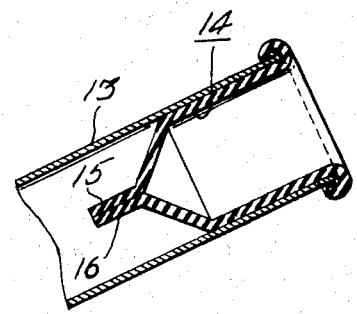
FIG. 6 is a sectional view illustrating the upper end of a fillpipe utilizing the invention.

FIGS. 4–6 illustrate one embodiment of a racing-car refueling system according to this invention. The racing automobile 11 carries a fuel tank 12 (termed a fuel cell in racing circles) which has a fillpipe 13 one end of which communicates with the tank or cell 12 and which extends from the tank in a generally upward direction to the exterior of the automobile. To refuel the automobile 11, a receptacle 1 containing fuel and having mounted thereon the pincher assembly 6 previously described, wherein member 8 extends substantially at 90° to the receptacle longitudinal axis as illustrated in FIG. 3 and wherein the hose 4, as a result, is pinched closed) is raised to a position (without appreciable tilting) wherein the "bent" dispensing tube 8 is aligned with the fillpipe (see FIG. 4), and then this rigid dispensing tube is inserted into the fillpipe 13. It may be noted that even if some tilting of the receptacle 1 from the upright position does occur during this step, no spillage of fuel can take place because the hose 4 is pinched closed at this time.

After insertion of the dispensing tube 8 into the fillpipe 13, the receptacle 1 is raised (i.e., tilted away from its upright position toward or beyond the horizontal), as illustrated in FIG. 5. The member (or rigid dispensing tube) 8 comes into engagement with the rigid fillpipe 13 and is therefore held substantially fixed or stationary during this tilting of the receptacle; as a result, the member 8 is swung or pivoted (against the bias of spring 10) to the "straight" or tubing-bore-open (unpinched) position described in connection with FIG. 2, and as illustrated in FIG. 5. The liquid (fuel) contained in receptacle 1 then flows freely (by gravity) into fillpipe 13, and on into tank 12. The gravity-refueling operation depicted in FIGS. 4 and 5, and just described, can be carried out very rapidly, without any appreciable spillage of fuel.

A pre-formed flexible tube 14 (see FIG. 6), made of a suitable synthetic elastomeric material highly resistant to gasoline, is fitted into the fillpipe 13. One end of this tube is cylindrical, and this end is sealed into the upper end of the fillpipe, as shown. At its opposite end, tube 14 has a pair of mating lips 15 and 16 normally and inherently urged into engagement with each other to provide a seal; this construction provides a duck-bill valve. This normally closed valve comprises an anti-spill feature for the tank or fuel cell 12, and provides another part of the "tight-break" refueling system of this invention. With this arrangement, the conventional screw-type gas tank cap would probably not be necessary, and might be omitted.

The lips 15 and 16 are (resiliently) yieldable to permit the passage therebetween of a rigid dispensing tube. Thus, when the receptacle-carried member 8 is inserted into the fillpipe 13 as previously described in connection with FIGS. 4 and 5, the rigid tube 8 forces the duck-bill valve open by passing between the lips 15 and 16. At the same time, a tight seal is provided between the receptacle 1 and the fillpipe 13, around the outer surface of member 8. This last-mentioned seal is effective during the dispensing (gravity flow) of fuel from receptacle 1 into the fillpipe 13. Because of this last-mentioned seal, the system of the present invention may be thought of also as a "tight-fill" system, in addition to being a "tight-break" system.

When the member 8 is withdrawn from the fillpipe 13 (at the conclusion of the dispensing operation), the mating lips 15 and 16 of the duck-bill valve again come into engagement with each other to provide a seal at the upper end of the fillpipe.

According to the embodiment of FIGS. 4 and 5, the inner end of a length of tubing 17 which can serve as a combined sight glass and vent tube communicates with the upper portion of tank or cell 12. From the tank 12, this tubing 17 extends outwardly (upwardly) to the deck of the car 11, the portion of tubing 17 overlying such deck being in the form of a coil 18 mounted on the deck. The outer end 19 of tubing 17 (beyond the coil 18) is turned upwardly slightly, as illustrated, and is open to the atmosphere. The tubing 17 is transparent, and may be made from a suitable synthetic material.

The tubing 17 (including of course the coil 18) is of a length sufficient to prevent the escape of fuel therethrough (to the atmosphere) when the tank 12 is full. That is to say, fuel blow-out from the tank vent is prevented, providing an anti-splash feature for the fuel cell 12. Since the tubing is transparent, it can serve as a sight glass, for use during the refueling operation (i.e., during the dispensing of fuel into tank 12). The operator watches the deck coil 18 of the vent tube, and stops pouring gasoline out of the receptacle 1 into cell 12 when the fuel becomes visible in the tube. The inertia of the liquid fuel, as it flows rapidly from the receptacle 1 down the fillpipe 13 into the tank 12, would cause it to blow into the vent tube, but it would not discharge to the atmosphere because of the length of the coil of tubing.

After the receptacle 1 is withdrawn from the fillpipe, the fuel in the vent tubing 17 will drain back down into the tank 12. Because of this (extra) quantity of fuel originally in the vent tube, the tank 12 will be filled more completely than with a conventional refueling system (which does not utilize a vent tube such as the arrangement 17–19).

As previously stated, the conventional refueling system for racing automobiles (as prescribed by the SCCA regulations) utilizes simply the receptacle 1 illustrated in FIG. 1, with a length of flexible hose (12 inch maximum) attached to the nozzle 2. Field tests were made in order to compare this conventional system to the refueling system of the present invention, the latter including particularly the pinch type self-closing valve 6–10 on the receptacle and the duck-bill valve 14–16 in the fillpipe. In these tests, water was used as the liquid in the receptacle 1, rather than fuel; the weight of the receptacle when filled with water, of course, is somewhat greater than its weight when filled with fuel.

In the tests, with the conventional refueling system an average of 87.3 oz. of liquid was spilled during each dispensing operation (of 11 gallons), and the complete operation required an average time of 18.7 seconds. With the refueling system of the present invention an average of only 3 oz. of liquid was spilled per dispensing operation, and the complete operation required an average time of only 13.1 seconds. Although the phenomenal reduction in spillage (with the refueling system of the present invention) was not unexpected, the substantial reduction in the time required for the operation was quite unexpected, and was not foreseen.

The embodiment previously described (in connection with FIGS. 4 and 5) includes a vent tube arrangement 17-19 which is mounted on the rear deck of the automobile 11. As previously described, the arrangement 17-19 also functions to provide an indication of a full fuel tank, or fuel cell. It may be preferred, in some cases, to provide an indicator for a full tank which is mounted on the fuel tank itself. Such an indicator is provided in a second embodiment of the "tight-break" refueling system, now to be described in connection with FIGS. 7-9. In FIGS. 7-9, elements the same as those described previously are denoted by the same reference numerals, while analogous elements are denoted by the same reference numerals but carrying prime designations.

In this second or other embodiment, the pincher assembly 6' (to which one end of the transparent, flexible hose 4 is secured by means of a ring fastener 5', which also secures the assembly 6' in place on can nozzle 2) comprises two pairs of arms such as 21 and 22 (which may be thought of as metallic straps) pivotally connected together in pairs as at 9, the two pairs being at respective diametrically-opposite locations with respect to nozzle 2. Each of the two lower arms such as 21 is fastened to ring 5' at one end, the pivot 9 being at its other end. Each of the two upper arms such as 22 is secured at one end to a short rigid tubular member 8', the pivot 9 being at its other end. The hose 4 extends from can nozzle 2 more or less parallel to the arms 21 and 22 into member 8', terminating just short of the outer end of this latter member.

The pincher assembly 6' provides a pinch-type self-closing valve similar to that previously described in connection with FIGS. 2 and 3. The assembly 6' is biased to the "bent" position illustrated in FIG. 7 by means of tension spring 10. When arm 22 is in the "bent" or FIG. 7 position (non-parallel to the receptacle longitudinal axis), the hose 4 is pinched off by being bent upon itself, closing off the flow area of this hose. When arm 22 is in the "straight" or FIG. 8 position (substantially parallel to the receptacle longitudinal axis), the flow area of hose 4 is completely open and unobstructed. Just as in the first embodiment (previously described), the pincher assembly 6' may be brought to the FIG. 8 (valve open) position by overcoming the bias of spring 10.

The relatively open framework provided by the paired arms 21 and 22 permits visual observation of the flow of fuel through the transparent tubing 4 in the fueling or dispensing position of FIG. 8. The FIG. 7 position may be thought of as the rest position.

The embodiment just described, including the self-closing pinch-type valve on the can 1 and the self-closing duck-bill valve on fillpipe 13, operates in exactly the same manner as previously described in connection with FIGS. 4 and 5. The FIG. 7 position or stage of operation is quite similar to the FIG. 4 position, with the hose pinch valve and the duck-bill valve 14 both closed, and the dispensing member 8' ready to be inserted into fillpipe 13. In FIG. 8, as in FIG. 5, the rigid member 8' has parted the lips 15 and 16 of the duck-bill valve 14, the receptacle 1 has been raised to open the pinch valve on hose 4, and gasoline is flowing by gravity from receptacle 1 into tank 12 of the automobile 11.

A hilt arrangement is provided on the rigid dispensing (or insertion) member 8'. See particularly FIG. 9. The hilt arrangement comprises three radially-extending rigid metal bars 23-25 which extend outwardly from the outer surface of member 8' and are firmly secured thereto. A "top" bar 23 is located diametrically opposite the point of attachment of spring 10 to member 8', and two bars 24 and 25 (which may be thought of as "horizontal" bars) are located diametrically opposite each other and each at 90° from the point of attachment of spring 10.

In the dispensing position (FIG. 8), the bars 23-25 all press against the outer end (or bezel) of the fillpipe 13. The two "horizontal" bars 24 and 25 serve as a stop, to prevent the rigid member 8' from being inserted too far into the fillpipe 13. The "top" bar 23 provides a reactive force, to overcome the force of spring 10 when the can is lifted from the position of FIG. 7 to that of FIG. 8.

A fuel level indicator, denoted generally by numeral 26, is mounted essentially on fuel tank 12, to provide a positive indication of a "full" fuel tank. This indicator is similar to the so-called "magic eye" indicator often used on automobile storage batteries to indicate liquid level. In essence, it comprises a length of light-transmitting rod (of a synthetic material) having light-gathering properties at one end and light-reflecting properties at the other. Thus, it may be thought of as a fiber optic type of indicator.

The outer end 27 of rod 26 is rounded and polished, and is exposed to natural or artificial light at the rear of automobile 11, at a location adjacent the outer end of fill-pipe 13; the rod extends more or less parallel to the fillpipe. The tube outer end 27 may be recessed slightly into the automobile body, so that it will not be in the way of the "hilt" bars 23-25 when the member 8' is pushed home into fillpipe 13.

The inner end 28 of rod 26 is conical in shape and is polished; this end extends into the upper portion of fuel tank (cell) 12.

Light is gathered at the exposed end 27 and is transmitted down the rod 26. This light is reflected from the polished conical end 28 and returns to the round end 27, resulting in a bright glow at this end when the level of fuel in tank 12 is below tube end 28 (as illustrated in FIG. 7).

When the liquid fuel in tank 12 touches the conical end 28 (FIG. 8), the angle of refraction of the light is changed such that the light is transmitted into the liquid and is not reflected back up the rod 26; then, the round end 27 turns black, indicating that the tank is "full" (as illustrated in FIG. 8).

This change in color at the round end 27 (from "low" fuel level to "full," from a bright glow to black) is very marked, and can be seen easily by the operator (who is pouring gasoline into the tank as in FIG. 8). Thus, with the conical end 28 positioned at a predetermined level in the tank 12, it can be filled with no spillage. Setting the rod end 28 a little low in the tank 12 would allow for the reaction time of the operator, and also for the residual fuel in the fillpipe 13.

The invention claimed is:

1. An automobile refueling system comprising a fuel tank carried by the automobile and having a rigid fillpipe extending in a generally upward direction from the tank to the exterior of the automobile; an elongated portable generally cylindrical receptacle adapted to contain fuel, said receptacle having a flexible-walled outlet hose coupled to one end thereof, a pivotally-mounted rigid dispensing tube surrounding an end portion of said hose and acting on said hose to pinch the bore thereof closed when said tube is pivoted to a bent position wherein it extends at a substantial angle to the receptacle longitudinal axis and to open the bore of said hose when said tube is pivoted to a straight position wherein it extends substantially parallel to the receptacle longitudinal axis, and means normally biasing said tube to its bent angular position; whereby said tube may be inserted in its bent position into said fillpipe and then the receptacle raised upwardly to cause said tube due to engagement with said rigid fillpipe to be pivoted to its straight parallel position to open the bore of said hose and allow the contents of said receptacle to flow downwardly through said hose into said fillpipe.

2. System according to claim 13, including also a duck-bill valve of resilient material mounted in said fillpipe, the lips of said valve being normally closed and sealed but being adapted to be forced open when said rigid dispensing tube is inserted into said fillpipe.

3. System set forth in claim 13, including also a duck-bill valve of resilient material mounted in said fillpipe, the lips of said valve being normally closed and sealed but being adapted to be forced open when said rigid dispensing tube is inserted into said fillpipe; and a transparent vent tube coupled at one end to the upper portion of said tank and at its other end to the atmosphere, said vent tube being visible from the exterior of the automobile and having a length sufficient to prevent escape of fuel therethrough to the atmosphere when said fuel tank is full.

* * * * *